UNITED STATES PATENT OFFICE.

IVISON H. HUDDLESTON, OF NEW BERNE, NORTH CAROLINA.

COMPOSITION OF MATTER FOR GREASING PLUG-TOBACCO MOLDS OR SHAPES.

SPECIFICATION forming part of Letters Patent No. 281,997, dated July 24, 1883.

Application filed April 30, 1883. (No specimens.)

*To all whom it may concern:*

Be it known that I, IVISON H. HUDDLESTON, of New Berne, in the county of Craven and State of North Carolina, have invented a new and Improved Composition of Matter for Greasing Plug-Tobacco Molds or Shapes and Cigar-Molds, of which the following is a full, clear, and exact description.

My composition consists of the following ingredients, combined in the proportions stated, viz: olive-oil, two pounds; beeswax, twelve ounces; oil of sassafras, one-half ounce; oil of anise, one-half ounce. These ingredients—the beeswax and olive-oil—are to be mixed together by placing them in a suitable vessel over a slow fire and gently stirring them until they are thoroughly dissolved and mixed together, care being taken that the heat does not reach the boiling-point. The vessel will now be removed from the fire, and the flavoring stirred into the mixture.

The mixture is to be applied to the molds by rubbing it in suitable quantities upon them, either with a brush, the hands, or with a woolen or other suitable cloth, or a sponge.

This mixture is cheaper than sweet-oil, which is generally used for greasing tobacco-molds, and by the use of this composition the frequent washing of the molds, which is necessary when sweet-oil is used, is obviated.

Instead of using the oil of sassafras, the oil of anise or wintergreen, or any other suitable flavoring, may be used; or the flavoring might be omitted, if desired, and the amount of beeswax may be varied according to circumstances.

Having thus described my invention, I claim as new and desire to secure by Letters Patent—

The herein-described composition of matter to be used for greasing tobacco-molds, consisting of olive-oil and beeswax, with or without flavoring, in about the proportions specified.

IVISON H. HUDDLESTON.

Witnesses:
ALEX. L. BLAU,
ISAAC A. LUGG.